United States Patent [19]
Chung

[11] Patent Number: 5,777,917
[45] Date of Patent: Jul. 7, 1998

[54] SIMPLIFICATION OF LOOKUP TABLE

[75] Inventor: Shine Chien Chung, San Jose, Calif.

[73] Assignee: Hitachi Micro Systems, Inc., San Jose, Calif.

[21] Appl. No.: 621,726

[22] Filed: Mar. 21, 1996

[51] Int. Cl.⁶ .................................................. G06F 7/52
[52] U.S. Cl. .................................... 364/767; 364/764
[58] Field of Search .............................. 364/761, 764, 364/766, 767

[56] References Cited

U.S. PATENT DOCUMENTS 5,258,944  11/1993  Smith ........................... 364/767

OTHER PUBLICATIONS

Section by David Goldberg entitled "Speeding Up Integer Multiplication and Division" in book Computer Architecture: A Quantitative Approach by David Patterson et al., published by Morgan Kaufmann Publishers dated 1990.

*Primary Examiner*—Tan V. Mai
*Attorney, Agent, or Firm*—Graham & James LLP

[57] ABSTRACT

A method and apparatus for reducing by about half the size of a lookup table containing the partial quotients for radix-4 SRT division with a carry-save adder. The method involves storing in computer memory the positive half of the lookup table and determining partial quotients for negative partial remainders by inverting the data bits of the negative partial remainders and subtracting one therefrom. Then the partial quotients associated with the negative partial remainders are looked up in the positive half of the lookup table by use of the thus computed positive partial remainder and of a selected value of a divisor.

26 Claims, 6 Drawing Sheets

```
            125 (Partial Quotient)
              2 5         110 (Division)
    120    ┌────────
 (Divisor) │
       5   │ 1 2 6   115 (Dividend)
           │ 1 0
           │   2 6
     130   │   2 5
  (Partial │       1
 Remainder)
```

FIG. 1
(Prior Art)

TABLE I — QUOTIENT DIGITS FOR RADIX-4 SRT DIVISION WITH CSA

| b/P | -24 | -23 | -22 | -21 | -20 | -19 | -18 | -17 | -16 | -15 | -14 | -13 | -12 | -11 | -10 | -9 | -8 | -7 | -6 | -5 | -4 | -3 | -2 | -1 |
|---|---|---|---|---|---|---|---|---|---|---|---|---|---|---|---|---|---|---|---|---|---|---|---|---|
| 8(1000)  | -2 | -2 | -2 | -2 | -2 | -2 | -2 | -2 | -2 | -2 | -1 | -1 | -1 | -1 | -1 | -1 | -1 | -1 | -1 | -1/0 | 0 | 0 | 0 | -2 -1 |
| 9(1001)  | -2 | -2 | -2 | -2 | -2 | -2 | -2 | -2 | -2 | -2 | -1 | -1 | -1 | -1 | -1 | -1 | -1 | -1 | -1 | -1/0 | 0 | 0 | 0 | 0 |
| 10(1010) | -2 | -2 | -2 | -2 | -2 | -2 | -2 | -2 | -1 | -1 | -1 | -1 | -1 | -1 | -1 | -1 | -1 | -1 | -1/0 | -1/0 | 0 | 0 | 0 | 0 |
| 11(1011) | -2 | -2 | -2 | -2 | -2 | -2 | -2 | -2 | -1 | -1 | -1 | -1 | -1 | -1 | -1 | -1 | -1 | -1 | -1/0 | -1/0 | 0 | 0 | 0 | 0 |
| 12(1100) | -2 | -2 | -2 | -2 | -2/-1 | -2 | -2 | -1 | -1 | -1 | -1 | -1 | -1 | -1 | -1 | -1 | -1 | -1/0 | -1/0 | 0 | 0 | 0 | 0 | 0 |
| 13(1101) | -2 | -2 | -2 | -2 | -1 | -1 | -1 | -1 | -1 | -1 | -1 | -1 | -1 | -1 | -1 | -1 | -1/0 | -1/0 | 0 | 0 | 0 | 0 | 0 | 0 |
| 14(1110) | -2 | -2/-1 | -2/-1 | -1 | -1 | -1 | -1 | -1 | -1 | -1 | -1 | -1 | -1 | -1 | -1 | -1 | -1/0 | -1/0 | 0 | 0 | 0 | 0 | 0 | 0 |
| 15(1111) | -2/-1 | -1 | -1 | -1 | -1 | -1 | -1 | -1 | -1 | -1 | -1 | -1 | -1 | -1 | -1 | -1/0 | -1/0 | 0 | 0 | 0 | 0 | 0 | 0 | 0 |

| b/P | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 8(1000)  | 0 | 0 | 1 0/1 | 0/1 | 1 | 1 | 1 | 1 | 1 | 1 | 1 | 1 | 2 | 2 | 2 | 2 | 2 | 2 | 2 | 2 | 2 | 2 | 2 | 2 |
| 9(1001)  | 0 | 0 | 0 | 0 | 0/1 1 | 1 | 1 | 1 | 1 | 1 | 1 | 1 | 2 | 2 | 2 | 2 | 2 | 2 | 2 | 2 | 2 | 2 | 2 | 2 |
| 10(1010) | 0 | 0 | 0 | 0 | 0/1 1 | 1 | 1 | 1 | 1 | 1 | 1 | 1 | 1 | 2 | 2 | 2 | 1/2 2 | 2 | 2 | 2 | 2 | 2 | 2 | 2 |
| 11(1011) | 0 | 0 | 0 | 0 | 0 0/1 | 1 | 1 | 1 | 1 | 1 | 1 | 1 | 1 | 2 | 2 | 2 | 1/2 2 | 2 | 2 | 2 | 2 | 2 | 2 | 2 |
| 12(1100) | 0 | 0 | 0 | 0 | 0 0/1 | 0/1 1 | 1 | 1 | 1 | 1 | 1 | 1 | 1 | 2 | 2 | 1/2 | 1 | 2 | 2 | 2 | 2 | 2 | 2 | 2 |
| 13(1101) | 0 | 0 | 0 | 0 | 0 0/1 | 0/1 1 | 1 | 1 | 1 | 1 | 1 | 1 | 1 | 1 | 2 | 1/2 | 1 | 1/2 | 2 | 2 | 2 | 2 | 2 | 2 |
| 14(1110) | 0 | 0 | 0 | 0 | 0 | 0/1 1 | 0/1 1 | 1 | 0/1 1 | 1 | 1 | 1 | 1 | 1 | 1 | 1 | 1 | 1 | 1 1/2 | 1 1/2 | 1/2 1 | 1/2 1 | 2 | 2 |
| 15(1111) | 0 | 0 | 0 | 0 | 0 | 0/1 | 0/1 | 0/1 1 | 0/1 1 | 1 | 1 | 1 | 1 | 1 | 1 | 1 | 1 | 1 | 1 | 1 | 1 | 1 | 1/2 | 1/2 |

FIG. 2 (PRIOR ART)

TABLE II
QUOTIENT DIGITS FOR RADIX-4 SRT DIVISION WITH CSA

| b/P | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 8(1000) | 0 | 0 | 0 | 0/1 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 |
| 9(1001) | 0 | 0 | 0 | 0 | 0/1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 |
| 10(1010) | 0 | 0 | 0 | 0 | 0/1 | 0/1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 2 | 2 | 2 |
| 11(1011) | 0 | 0 | 0 | 0 | 0/1 | 0/1 | 1 | 1 | 1 | 1 | 1 | 1 | 1 | 1 | 1 | 2 | 1/2 | 2 | 2 | 2 | 2 | 2 | 2 | 2 | 2 | 2 | 2 | 2 | 2 | 2 | 2 | 2 |
| 12(1100) | 0 | 0 | 0 | 0 | 0 | 0/1 | 0/1 | 1 | 1 | 1 | 1 | 1 | 1 | 1 | 1 | 1 | 1/2 | 2 | 2 | 2 | 2 | 2 | 2 | 2 | 2 | 2 | 2 | 2 | 2 | 2 | 2 | 2 |
| 13(1101) | 0 | 0 | 0 | 0 | 0 | 0/1 | 0/1 | 1 | 1 | 1 | 1 | 1 | 1 | 1 | 1 | 1 | 1 | 1/2 | 1/2 | 2 | 2 | 2 | 2 | 2 | 2 | 2 | 2 | 2 | 2 | 2 | 2 | 2 |
| 14(1110) | 0 | 0 | 0 | 0 | 0 | 0/1 | 0/1 | 1 | 1 | 1 | 1 | 1 | 1 | 1 | 1 | 1 | 1 | 1 | 1 1/2 | 1 | 1/2 1/2 | 1 | 2 | 2 | 2 | 2 | 2 | 2 | 2 | 2 | 2 | 2 |
| 15(1111) | 0 | 0 | 0 | 0 | 0 | 0 | 0/1 | 0/1 | 1 | 1 | 1 | 1 | 1 | 1 | 1 | 1 | 1 | 1 | 1 | 1 | 1/2 1/2 | 2 | 2 | 2 | 2 | 2 | 2 | 2 | 2 | 2 | 2 | 2 |
| 8(1000) | 0 | 0 | 0 | -1/0 | -1 | -1 | -1 | -1 | -1 | -1 | -1 | -1 | -2 | -2 | -2 | -2 | -2 | -2 | -2 | -2 | -2 | -2 | -2 | -2 | -2 | -2 | -2 | -2 | -2 | -2 | -2 | -2 |
| 9(1001) | 0 | 0 | 0 | 0 | -1/0 | -1 | -1 | -1 | -1 | -1 | -1 | -1 | -1 | -1 | -2 | -2 | -2 | -2 | -2 | -2 | -2 | -2 | -2 | -2 | -2 | -2 | -2 | -2 | -2 | -2 | -2 | -2 |
| 10(1010) | 0 | 0 | 0 | 0 | -1/0 | -1 | -1 | -1 | -1 | -1 | -1 | -1 | -1 | -1 | -1 | -2 | -2 | -2 | -2 | -2 | -2 | -2 | -2 | -2 | -2 | -2 | -2 | -2 | -2 | -2 | -2 | -2 |
| 11(1011) | 0 | 0 | 0 | 0 | -1/0 | -1/0 | -1 | -1 | -1 | -1 | -1 | -1 | -1 | -1 | -1 | -2 | -2/-1 | -2 | -2 | -2 | -2 | -2 | -2 | -2 | -2 | -2 | -2 | -2 | -2 | -2 | -2 | -2 |
| 12(1100) | 0 | 0 | 0 | 0 | 0 | -1/0 | -1/0 | -1 | -1 | -1 | -1 | -1 | -1 | -1 | -1 | -1 | -1 | -2/-1 | -2 | -2 | -2 | -2 | -2 | -2 | -2 | -2 | -2 | -2 | -2 | -2 | -2 | -2 |
| 13(1101) | 0 | 0 | 0 | 0 | 0 | -1/0 | -1/0 | -1 | -1 | -1 | -1 | -1 | -1 | -1 | -1 | -1 | -1 | -1 | -2/-1 | -2/-1 | -2/-1 | -2 | -2 | -2 | -2 | -2 | -2 | -2 | -2 | -2 | -2 | -2 |
| 14(1110) | 0 | 0 | 0 | 0 | 0 | -1/0 | -1/0 | -1 | -1 | -1 | -1 | -1 | -1 | -1 | -1 | -1 | -1 | -1 | -1 | -2/-1 | -2/-1 | -2 | -2 | -2 | -2 | -2 | -2 | -2 | -2 | -2 | -2 | -2 |
| 15(1111) | 0 | 0 | 0 | 0 | 0 | 0 | -1/0 | -1/0 | -1 | -1 | -1 | -1 | -1 | -1 | -1 | -1 | -1 | -1 | -1 | -1 | -2/-1 -2/-1 | -2/-1 -2/-1 | -2 | -2 | -2 | -2 | -2 | -2 | -2 | -2 | -2 |
| b/P | -2 -3 | -4 -5 | -6 -7 | -8 -9 | -10 -11 | -12 -13 | -14 -15 | -16 -17 | -18 -19 | -20 -21 | -22 -23 | -24 -25 | -26 -27 | -28 -29 | -30 -31 | -32 -33 |

SIMPLIFICATION OF LOOKUP TABLE

BACKGROUND OF THE INVENTION

Figure 1:
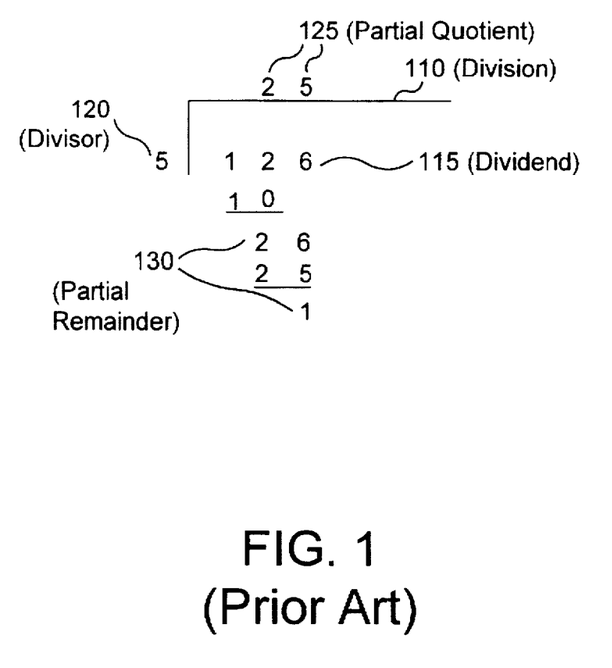
FIG. 1 illustrates the prior art terms used in a division operation.

Many computer applications need to execute a division of two numbers. FIG. 1 reviews the terms commonly used to describe a division 110. For instance, when dividing the number "126" by the number "5" the result is the number "25" with the number "1" left over, where for simplicity the numbers are in decimal notation. The number "126" is referred to as a dividend 115, the number "5" is referred to as the divisor 120, the numbers "2" and "5" are referred to as partial quotients 125, and the numbers "26" and "1" are referred to as partial remainders 130.

SRT division (developed by Sweeney, Robertson, and Tocher) is a well-known method for performing a division of binary numbers with a computer processor. The SRT division method relies on a lookup table to perform divisions.

Figure 2:
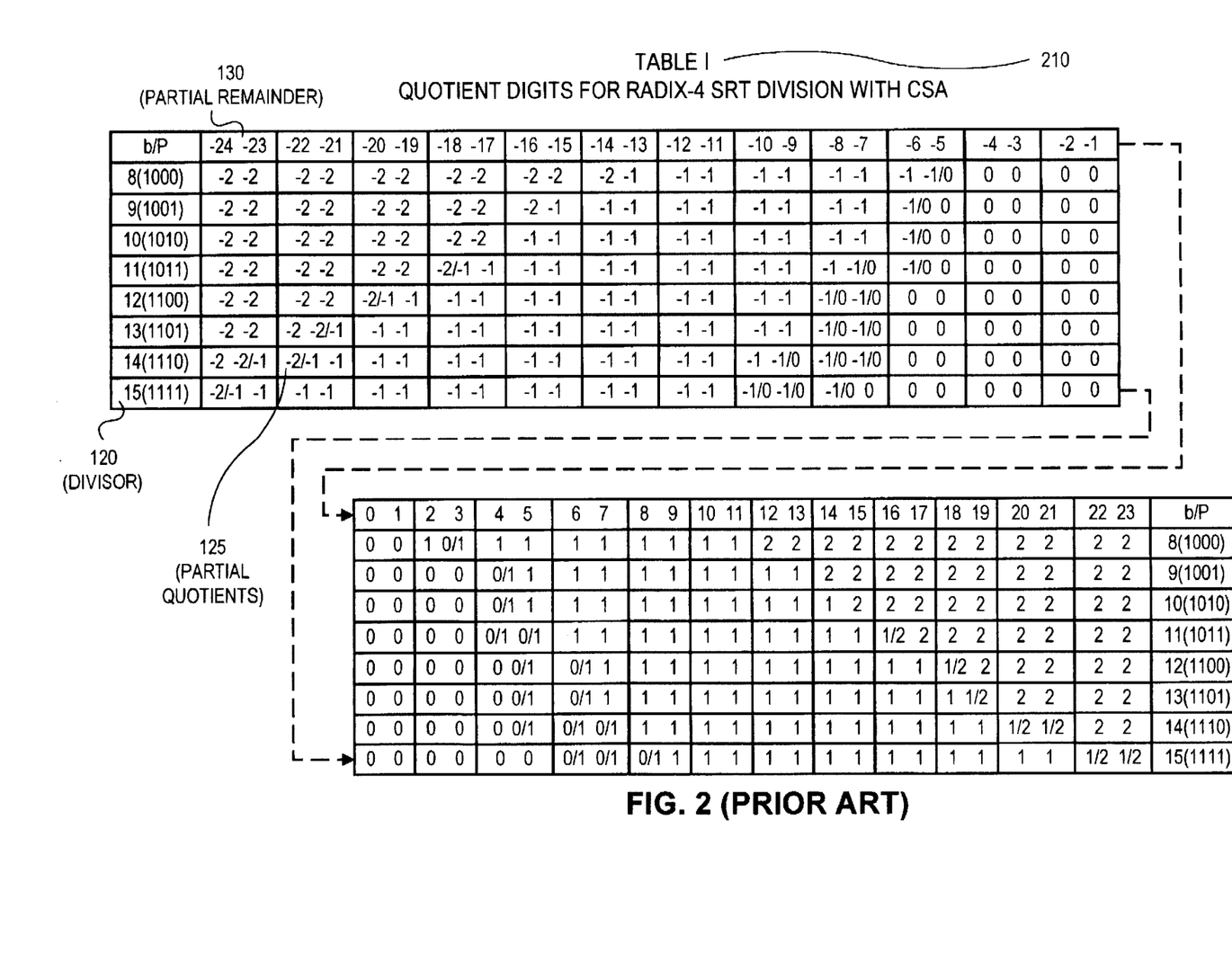
FIG. 2 is a conventional lookup table for partial quotients for radix-4 SRT division executed with a carry-save adder.

FIG. 2 shows a Table I 210 which is such a lookup table. Table I 210, contains in the left-most column the four most significant bits of divisors 120 shown in parentheses. For simplicity of discussion, the divisors 120 also are shown in decimal notation to the left of the parentheses. The divisor 120 is designated as b. Both the dividend 115 and the divisor 120 can be scaled to be within a certain range. In Table I, the dividend 115 (not shown in FIG. 2) and the divisor 120 have been scaled to be within ½ and 1. The top row of Table I 210 contains possible values of a partial remainder P 130 ranging from values of −24 to +23. Typically in computer memory applications, P 130 ranges from −32 to +31. However, for economy of space, Table I 210 shows a smaller range of values for the partial remainder 130. Table I 210 lists the partial quotients 125 for radix-4 SRT division executed with a carry-save adder.

In Table I 210, only the most significant six bits are shown for the remainder P 130. For simplicity, the partial remainders 130 are shown in decimal notation. When performing an SRT division, a lookup table 210 is used to look up the partial quotients 125 instead of computing them. SRT division is discussed in a book called *Computer Architecture: A Quantitative Approach*, which is hereby incorporated by reference. This book is written by David A. Patterson and John L. Hennessey and published by Morgan Kaufmann, Publishers, Inc., San Mateo, Calif., 1990. Table I 210 shows alternate values for partial quotients 125, as indicated by forward slashes. So, for example, for a divisor 120 of eight, and a partial remainder 130 of three, there are two possible quotients 125 listed: zero and one. In SRT division, when the radix equals four, possible partial quotients 125 are −2, −1, 0, 1, and 2. This is referred to as a side boundary representation.

Table I 210 is not symmetrical in that its right half (starting at a value of zero for the partial remainder 130) is not a mirror image of the left half (starting at a value of negative one for the remainder 130). To illustrate, for a divisor 120 of eleven and a partial remainder 130 of sixteen, the partial quotient 125 is one or two. But for the same divisor 120 with the partial remainder 130, however, being negative seventeen, the partial quotient 125 is simply a negative one. Therefore, not only is there a difference in the sign between the right and left half of Table I 210, but there also is a difference between the absolute values of the partial quotients 125. So, to do SRT division, the entire lookup table 210 is stored in memory. A lookup table 210 for SRT division commonly is stored in memory, such as PLA (programmed logic array) or ROM (read only memory) for access by the processor.

2

SUMMARY OF THE INVENTION

This invention provides a process and a system for reducing by half the size of a lookup table used in SRT division of binary numbers. In particular, this invention reduces by about half the complexity of a lookup table for radix-4 SRT division. This greatly simplifies the creation of such lookup tables. Therefore, the likelihood of errors in the entries of lookup tables is reduced significantly. Further, memory requirements are reduced by about half from conventional SRT lookup tables.

From a systems standpoint, a preferred embodiment of the invention comprises an apparatus for determining a partial quotient associated with a first partial remainder. The apparatus comprises an inverter for inverting the first partial remainder. In addition, the apparatus comprises a subtractor coupled to the inverter for subtracting a number from the first partial remainder for computing a second partial remainder. Further, the apparatus comprises a memory coupled to the subtractor having stored therein a partial quotient associated with the second partial remainder.

From a process standpoint, a preferred embodiment of the invention comprises the following steps for determining a partial quotient from a first partial remainder and a divisor. The first partial remainder is inverted with an inverter. A number is subtracted from the first partial remainder for computing a second partial remainder. A partial quotient associated with the second partial remainder and the divisor is looked up in memory. The sign of the looked up partial quotient is changed.

BRIEF DESCRIPTION OF THE FIGURES

FIG. 3 is a lookup table for partial quotients for radix-4 SRT division executed with a carry-save adder, where the table is divided into segments, in accordance preferred embodiment of the invention.

DETAILED DESCRIPTION OF PREFERRED EMBODIMENTS

As Table I 210 demonstrates, lookup tables can be fairly complicated and large, even though the partial remainders 130 in Table I 210 range only from negative 24 to positive 23. The present preferred embodiment dramatically simplifies such lookup tables by transforming them from nonsymmetric into quasi-symmetric lookup tables. In general, a quasi-symmetric table is symmetric but for a difference in sign between, for example, the right half (including a zero column) and the left half of the table.

FIG. 3 shows a lookup table, Table II 305, which illustrates how to reduce the complexity of Table I 210 by about half. Table II 305 comprises the positive half of Table I 210

(including the column of partial quotients 125 associated with the partial remainder 130 of value zero) positioned above the negative half of Table I 210, such that the partial remainder columns of zero and negative two are aligned with each other. As a result, also aligned are, for example, the columns for partial remainder values 130 of twenty-three and negative twenty-five. Discussed further below is the column of partial quotients 125 for a partial remainder 130 of negative one. With this rearrangement of Table I 210 and following several other considerations discussed below, it becomes apparent that Table II 305 is a quasi-symmetric table. It will further become apparent that due to this quasi-symmetry, the positive half of the lookup table 305 contains the information necessary for determining the partial quotients 125 in its negative half. Thus, as will be discussed in greater detail below, the number of entries in the lookup table 210, 305 can be greatly reduced. In Table II 305, the partial remainders 130 range from zero to thirty-one and from negative two to negative thirty-three. For partial remainders 130 beyond this range, the partial quotients 125 are either plus or minus two for positive or negative values of the partial remainder 130, respectively.

In Table II 305, table segmenting lines 310 and 320 divide the positive part of Table II 305 into three segments, 345, 350, and 355. Similarly, segmenting lines 330 and 340 divide the negative half of Table II 305 into three segments, 360, 365, and 370. Comparing these segments leads to the conclusion that they are similar. Actually, for example, segment 350 in the positive half of Table II 305 and segment 365 in the negative half of Table II 305 are identical except for the signs of the partial quotients 125 (and, of course, except for the partial remainders 130 with which the partial quotients 130 are associated). For example, except for the sign, the partial quotients 125 are equal for a divisor 120 of nine and partial remainders 130 of four and negative six. These partial quotients 125 are identical except for the sign, because a partial quotient 125 value of "0/1" is identical to a partial quotient 125 value of "−1/0." As was explained above, the forward slash simply indicates that there is a choice among two possible partial quotients 125. Of course, the order in which these alternate values are stored is immaterial.

Furthermore, segments 345 and 360 are identical in terms of the partial quotients 125 that they list, although again for different values of partial remainders 130 and for a difference in sign. Similarly, the segments 355 and 370 are identical, except for the sign, in terms of their partial quotients 125.

As a result of this alignment of the negative half of Table II 305 with its positive half, the left most column of the negative half of Table I 210, where the partial remainder 130 equals negative one, is in effect shifted out of the negative half. However, this left most column contains very little information, because as can be seen from Table I 210, this column contains only partial quotients 125 of zero. So indeed, for the partial remainder 130 of negative one, very little information (i.e., that the partial quotient 125 equals zero) needs to be stored in a separate memory space. This alignment creates symmetry in Table II 305, except for the sign, which, as mentioned above, is the reason for referring to this type of symmetry as quasi-symmetry. Following this alignment, the absolute values of the partial quotients 125 listed in the positive and negative halves of Table II 305 are identical. However, for identical absolute values of partial quotients 125, the absolute values of the negative partial remainders 130 are greater by two than the values of the positive partial remainders 130 with which they are aligned.

By accounting for this difference of two, there is no need to store the negative half of Table II 305. The positive half of Table II 305 contains all of the information contained in its negative half and consequently all of the information of the negative half of Table I 210, with the exception of the column for a partial remainder 130 having a value of negative one.

As further illustrated below, to obtain a partial quotient 125 for a negative partial remainder 130, one simply takes the absolute value of the negative partial remainder 130 and subtracts two from it to determine a positive partial remainder 130. (Of course, the partial quotients for a partial remainder 130 of negative one are determined directly by setting them to zero.) Knowing this positive partial remainder 130 and a divisor 120, the positive partial quotient 125 is determined. But the sign of this positive partial quotient is reversed, because only negative (or zero value) partial quotients 125 are associated with negative partial remainders 130. So, creating a lookup table becomes much simpler because only about half the memory space is needed to store the lookup table. To implement the above reduction in the size of Table II 305 by half, preferably the positive half of Table II 305 is stored in random logic (where memory is laid out in a random or semi-random fashion), but it can also be stored in, for example, ROM (read only memory), PLA (programmable logic array), on disk, or any other suitable type of memory. Because of the quasi-symmetry, the negative half of the table is not stored and this memory is saved.

Figure 4:
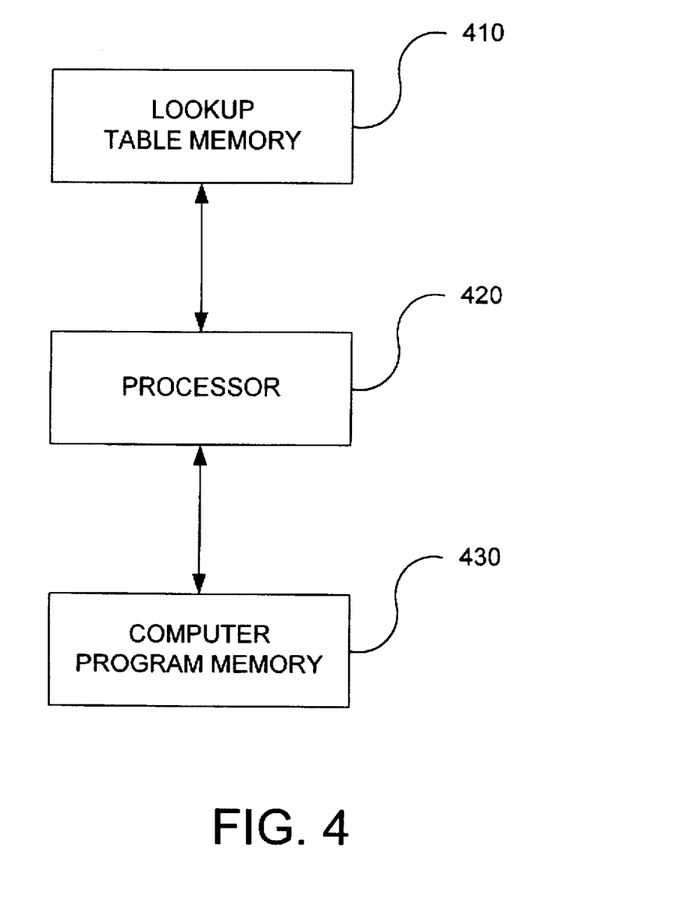
FIG. 4 is a system for looking up partial quotients in a lookup table, in accordance with a preferred embodiment of the invention.

FIG. 4 illustrates an implementation of a division using only a positive half of a lookup table, such as the positive half of Table II 305. A lookup table memory 410 is coupled to a processor 420. The processor is controlled by a computer program which is also stored in another memory called a computer program memory 430, which can be of the type discussed above in the context of the memory for the lookup table. The lookup table memory 410 contains the positive half of Table II 305 with additional information, such as the partial quotient column for a partial remainder value 130 of negative one. The program stored in the computer program memory 430 instructs the processor 420 on how to access the appropriate partial quotients 125 contained in Table II 305 according to the process steps set forth above, an discussed in detail immediately below. Of course, the lookup table and the computer program could be stored in the same memory.

Figure 5:
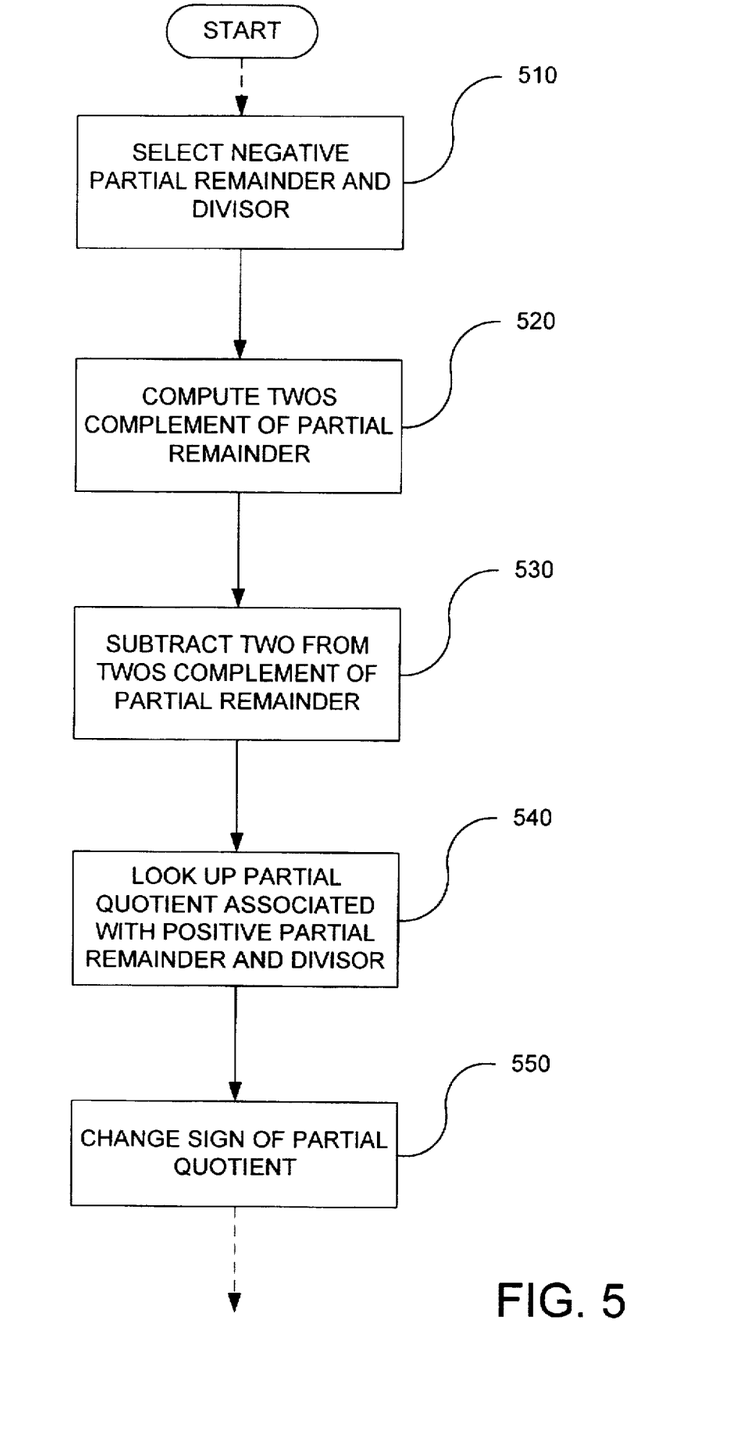
FIG. 5 is a flow chart of a process for determining partial quotients for negative values of partial remainders, in accordance with a preferred embodiment of the invention.

FIG. 5 illustrates how, in the embodiment of FIG. 4, the computer program stored in the memory 430 can instruct the processor 420 to obtain partial quotients 125 for negative values of partial remainders 130 using the positive half of Table II 305. In step 510, the software stored in memory 430 instructs the processor 420 to select a divisor 120 and a negative partial remainder 130. For example, the selected divisor 120 can be fifteen and the selected negative partial remainder 130 can be negative eight. Of course, typically, numbers stored in a memory 410 are stored in binary format, however, here for simplicity numbers are referred to by their decimal equivalent. In step 520, the software instructs the processor 420 to convert the negative partial remainder 130 into a positive number by computing a two's complement of the partial remainder 130. So, in step 520 the partial remainder 130 of negative eight has been converted into a partial remainder 130 of positive eight. In step 530, the software instructs the processor 420 to subtract two from the two's complement of the partial remainder 130. As a result, the value of the partial remainder 130 has been changed from a positive eight to a positive six.

In step 540, the software instructs the processor 420 to look up the partial quotient 125 associated with the positive partial remainder 130 computed in step 530. In this example, the positive partial remainder 130 equals six. Therefore, according to the positive half of Table II 305, the partial quotient 125 associated with a positive partial remainder 130 of six and the divisor 120 value of fifteen results in alternate possible partial quotients 125 of "0/1." Per step 550 of FIG. 5, the processor 420 changes the sign of these partial quotients 125. So the partial quotients 125 of "0/1" are converted into quotient digits "0/−1." To confirm this result, it can be seen from Table II 305 that indeed the alternate partial quotients 125 for a partial remainder 130 of negative eight and a divisor 120 of fifteen, the partial quotients 125 are "−1/0." Computer software is written to instruct a processor 420 to select either of the alternate partial quotients.

Figure 6:
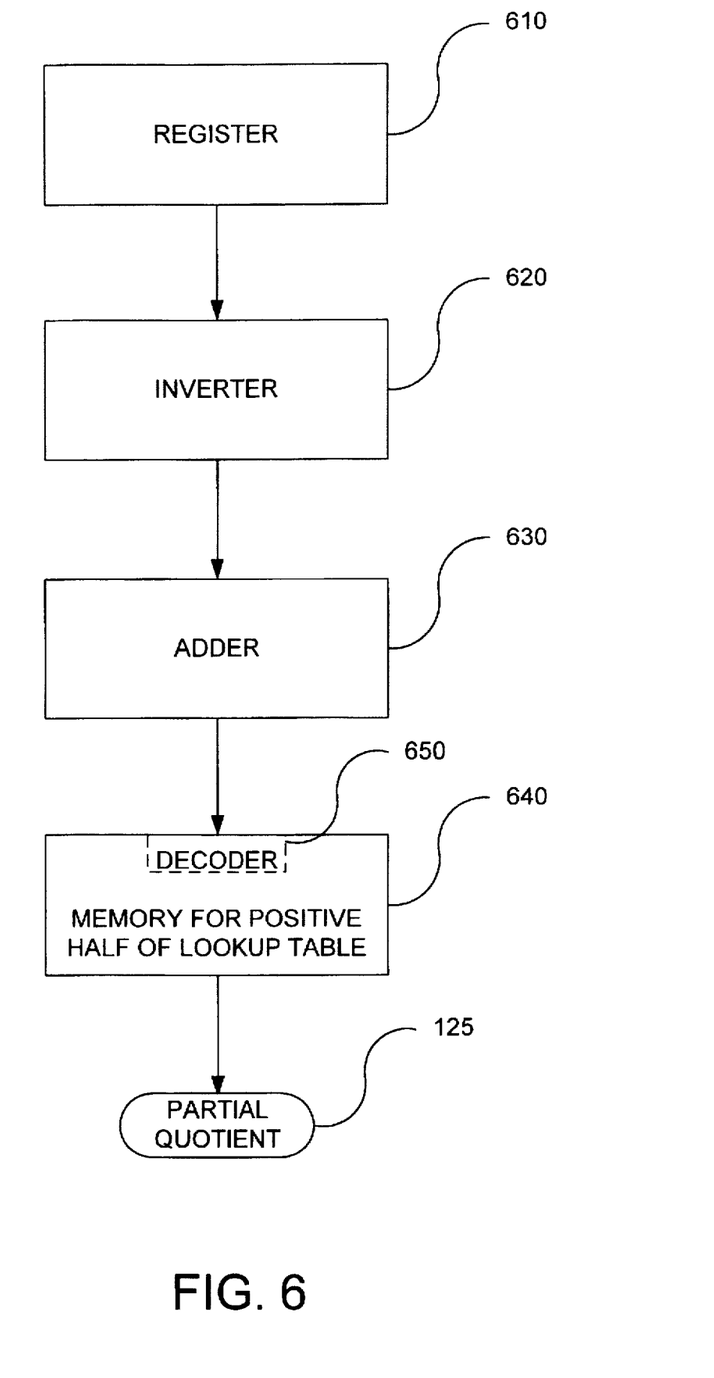
FIG. 6 is a block diagram illustrating a circuit for determining positive partial remainders for looking up partial quotients associated with negative partial remainders, in accordance with a preferred embodiment of the invention.

FIG. 6 illustrates a preferred embodiment of the invention. FIG. 6 shows a circuit in block diagram format for obtaining the partial quotient 125 from a negative partial remainder 130. In FIG. 6, a register 610 is hardwired to an inverter 620. The inverter 620 is hardwired to an adder 630, such as a carry propagation adder. The adder 630 is coupled to a memory 640, such as ROM, that contains a positive half of a lookup table 305. Again, the negative half is not necessary and explicitly omitted to save memory. The ROM 640 preferably includes a decoder 650 coupled to an output of the adder 630.

The circuit of FIG. 6 uses the positive half of the lookup table 305 to obtain a partial quotient 125 that corresponds to a negative partial remainder 130. Such a negative partial remainder 130 is stored in binary form in register 610. The inverter 620 inverts all of the data bits of the stored negative partial remainder 130 (i.e., changes the sign of each bit, unless, of course, a particular bit equals zero). The inverter 620 adds a negative one to the inverted partial remainder 130. Adding the negative one is preferably accomplished by taking a two's complement of a positive one and then adding it to the inverted partial remainder 130. Inverting all bits of the partial remainder 130 and adding a negative one to the inverted partial remainder 130 is equivalent to but more efficient than taking the two's complement of the partial remainder 130 and adding a negative two. That is so, because taking a two's complement involves inverting the bits of a binary number and adding a one to it.

To illustrate FIG. 6 using the example discussed in the context of the embodiment of FIG. 5, the inverter 620 obtains from the register 610 the partial remainder 130 of negative eight (binary "11000"). The inverter 620 inverts the negative eight bit by bit resulting in a binary number "00111". The adder 630 adds a negative 1 ("11111") to the output of the inverter 620 resulting in the binary number "00110," which equals positive six in decimal. As discussed above, the partial quotients 125 that correspond to this output of the adder 630 are the partial quotients for the partial negative remainder of negative eight, except for a change in sign. Once the adder 630 has added the negative one to the output of an inverter 620, the corresponding partial quotient 125 can be looked up in the positive half of the lookup table 305, as is well known in the art. In FIG. 6, the output of the adder 630, i.e., partial remainder 130 of value six, serves as the input into the decoder 650. The decoder 650 uses this partial remainder 130 to output from memory 640 the corresponding partial quotient (or quotients) 125. This partial quotient (or quotients) has its sign changed, as mentioned above. Of course, a change in sign is unnecessary for partial quotients 125 having a value of zero. Details of the construction of such circuits as the register, inverter, adder, decoder, and memory are well known in the art and have been omitted for the sake of simplicity.

Several preferred embodiments of the present invention have been described. Nevertheless, it will be understood that various modifications may be made without departing from the spirit and scope of the invention. For example, the discussion above has been in terms of binary numbers. However, as will be clear to one of ordinary skill in the art, other base numbers can be used, as well, such as octal and hexadecimal. Furthermore, the discussion has been in terms of radix-4. Yet, it will be clear to one of ordinary skill in the art that radix-2 is a trivial case of radix-4.

Also, based on the above description, it is clear that instead of storing in memory a positive half of the lookup table 305, one can store the negative half instead. Then partial quotients 125 for positive partial remainders 130 can be looked up in the stored negative half of the lookup table 305. The following example in decimal notation, illustrates this. A positive partial remainder 130 of value six, has its sign reversed (of course, when the partial remainder 130 equals zero, it is not inverted) and two subtracted from it to yield a value of negative eight. The partial quotient 125 associated with the positive partial remainder 130 of value six is determined by looking up and reversing the sign of (if necessary) the partial quotient 125 associated with the partial remainder 130 of value negative eight. Thus, the present invention is not limited to the preferred embodiments described herein, but may be altered in a variety of ways, which will be apparent to persons skilled in the art.

I claim:

1. A process for reducing the size of a lookup table used to determine a partial quotient from a first partial remainder and a divisor, the process comprising the steps of:

subtracting a number from the first partial remainder for computing a second partial remainder; and looking up in the reduced-size lookup table stored in a memory a partial quotient associated with the second partial remainder and the divisor, wherein the lookup table is reduced in size since a plurality of partial quotients associated with partial remainders all have a like sign.

2. The process of claim 1, wherein the step of looking up comprises looking up with a decoder in the reduced-size lookup table.

3. The process of claim 2, wherein the partial remainders all having the like sign comprise a partial remainder of value zero.

4. The process of claim 2, wherein the lookup table includes negative partial quotients and negative partial remainders.

5. The process of claim 2, wherein the lookup table includes positive partial quotients and positive partial remainders.

6. The process of claim 5, further comprising the step of storing in the memory the partial quotients associated with a partial remainder of value negative one.

7. The process of claim 1, further comprising the step of changing the sign of the looked up partial quotient.

8. The process of claim 1, wherein the number equals two.

9. The process of claim 1, further comprising the step of first inverting with an inverter the first partial remainder.

10. The process of claim 9, wherein the step of inverting with an inverter comprises taking a twos complement of the partial remainder.

11. The process of claim 9, wherein the first partial remainder is negative and comprises data bits;

wherein the step of inverting with an inverter comprises inverting each bit of the first partial remainder; and wherein the number equals one.

12. An apparatus for reducing the size of a lookup table used to determine a partial quotient associated with a first partial remainder, the apparatus comprising:

a subtractor for subtracting a number from the first partial remainder for computing a second partial remainder; and a memory coupled to the subtractor having stored therein a partial quotient associated with the second partial remainder, wherein the lookup table is reduced in size since a plurality of partial quotients associated with partial remainders all have a like sign.

13. The apparatus of claim 12, wherein the lookup table further contains partial quotients associated with a partial remainder of value zero.

14. The apparatus of claim 12, further comprising an inverter coupled to the subtractor for first inverting the first partial remainder.

15. The apparatus of claim 14, wherein the first partial remainder is negative and comprises data bits;

wherein the inverter inverts each data bit of the first partial remainder; and wherein the number equals one.

16. The apparatus of claim 12, wherein the lookup table includes positive partial quotients and positive partial remainders.

17. The apparatus of claim 16, further comprising partial quotients stored in the memory associated with a partial remainder of value negative one.

18. The apparatus of claim 12, wherein the lookup table includes negative partial quotients and negative partial remainders.

19. The apparatus of claim 12, wherein the memory comprises read only memory.

20. The apparatus of claim 12, wherein the memory comprises a programmable logic array.

21. The apparatus of claim 12, further comprising a decoder coupled to the memory.

22. A computer readable memory containing computer instructions, to reduce the size of a lookup table, for directing a computer to determine a partial quotient associated with a divisor and a first partial remainder by:

subtracting a number from the first partial remainder for computing a second partial remainder; and looking up in a reduced-size lookup table stored in memory a partial quotient associated with the second partial remainder and the divisor, wherein the lookup table is reduced in size since a plurality of partial quotients associated with partial remainders all have a like sign.

23. The computer readable memory of claim 22, further containing computer instructions for directing the computer to first invert the first partial remainder.

24. The computer readable memory of claim 23, further containing computer instructions for directing a computer to change the sign of the looked up partial quotient.

25. An apparatus for reducing size of a lookup table used to determine a partial quotient from a first partial remainder and a divisor, the apparatus comprising:

means for subtracting a number from the first partial remainder for computing a second partial remainder; and means for looking up with a decoder in a memory a partial quotient associated with the second partial remainder and the divisor, wherein the lookup table is reduced in size since a plurality of partial quotients associated with partial remainders all have a like sign.

26. The apparatus of claim 25, further comprising means for first inverting with an inverter the first partial remainder.

* * * * *